(12) United States Patent
Jokinen et al.

(10) Patent No.: US 8,144,450 B2
(45) Date of Patent: Mar. 27, 2012

(54) ELECTRONIC APPARATUS

(75) Inventors: Tapani Jokinen, Espoo (FI); Crispian Tompkin, Los Angeles, CA (US); Michael McKay, Frederiksberg (DK)

(73) Assignee: Nokia Corporation, Espoo (FI)

( * ) Notice: Subject to any disclaimer, the term of this patent is extended or adjusted under 35 U.S.C. 154(b) by 741 days.

(21) Appl. No.: 12/287,648

(22) Filed: Oct. 9, 2008

(65) Prior Publication Data
US 2010/0093409 A1    Apr. 15, 2010

(51) Int. Cl.
*H05K 5/00* (2006.01)
*H05K 7/00* (2006.01)
*H04M 1/00* (2006.01)

(52) U.S. Cl. ........... 361/679.01; 361/679.3; 361/679.56; 455/575.1; 455/575.4; 455/575.8

(58) Field of Classification Search ............. 361/679.01, 361/679.3, 679.56; 455/575.1, 575.4, 575.8
See application file for complete search history.

(56) References Cited

U.S. PATENT DOCUMENTS

| | | | | |
|---|---|---|---|---|
| 5,894,298 | A * | 4/1999 | Hoeksma | 345/102 |
| 6,243,595 | B1 * | 6/2001 | Lee et al. | 455/566 |
| 6,968,161 | B2 * | 11/2005 | Inomata et al. | 455/90.3 |
| 7,203,529 | B2 * | 4/2007 | Kim et al. | 455/575.1 |
| 7,409,236 | B1 * | 8/2008 | Luna et al. | 455/575.1 |
| 2005/0132292 | A1 * | 6/2005 | Nien | 715/718 |
| 2005/0197173 | A1 * | 9/2005 | Wee et al. | 455/575.4 |
| 2007/0021160 | A1 | 1/2007 | Li | 455/575.4 |
| 2007/0135181 | A1 * | 6/2007 | Ohki et al. | 455/575.1 |

FOREIGN PATENT DOCUMENTS

| WO | WO-2005081415 A1 | 9/2005 |
|---|---|---|
| WO | WO-2006123297 A2 | 11/2006 |
| WO | WO-2009080863 A1 | 7/2009 |

* cited by examiner

*Primary Examiner* — Anthony Haughton
(74) *Attorney, Agent, or Firm* — Harrington & Smith

(57) ABSTRACT

The invention relates to a configuration of an electronic apparatus that improves the utilization of the electronic apparatus. The better utilization is achieved by an apparatus including a body, a cover attached to the body, and a display part having a display, the display part being attached to the body and configured to slide between a first position and a second position such that when the display part is at rest in the first position, the cover overlaps at least a portion of the display, and when the display part is at rest in the second position, said portion of the display is visible.

18 Claims, 5 Drawing Sheets

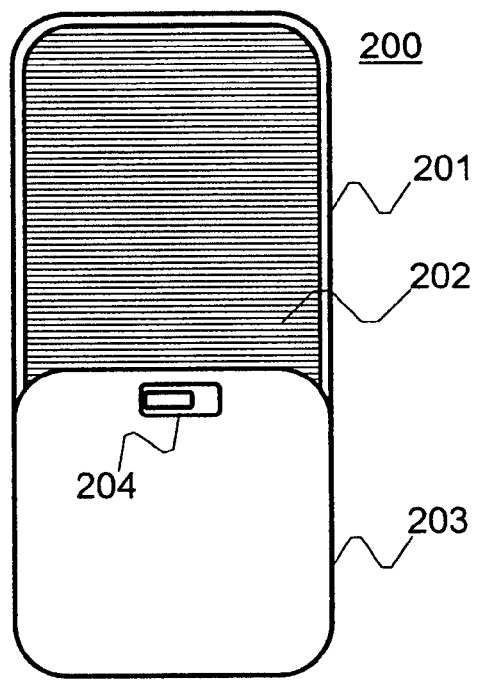
FIG. 2A
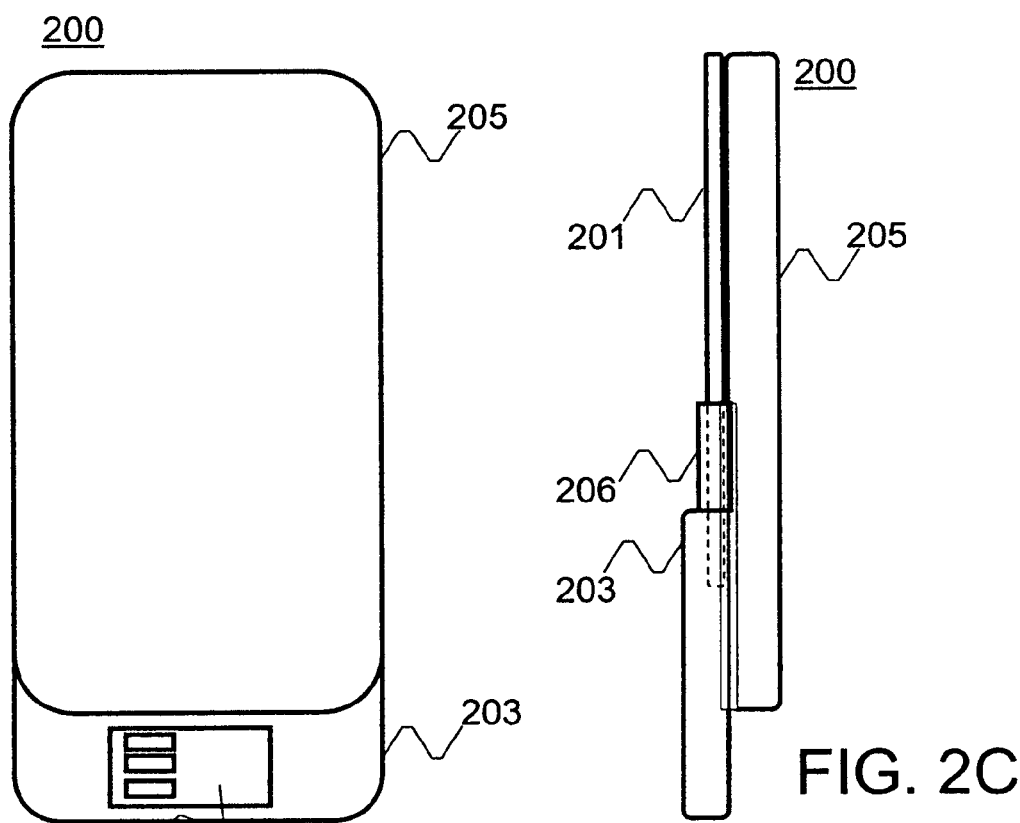
FIG. 2B
FIG. 2C

ELECTRONIC APPARATUS

FIELD OF THE INVENTION

The present invention relates in general to electronic apparatuses and in particular, but not exclusively, to a configuration of an electronic apparatus that improves the utilization of the electronic apparatus.

BACKGROUND OF THE INVENTION

Electronic apparatuses, such as mobile phones, Personal Digital Assistants (PDAs), handheld computers, remote controllers, game consoles, music players (such as MP3 players), and the like, are becoming increasingly commonplace. Typically, today's electronic devices are capable of processing large amounts of data due to increased data processing power and increased storage capacity. In many occasions, today's electronic apparatuses are multifunction devices that can be used e.g. as if they were combined mobile telephones and portable computers. Multifunction-type electronic apparatuses are often equipped with a full keyboard/keypad and/or a graphical user interface that can be operated by using a pointer device. Additionally or alternatively, a user interface may be operated by means of a touch display.

Another tendency relating to electronic apparatuses is to make them small and compact in size in order to meet consumer's requirements and expectations. Typically, the physical size of data processing and storage components used in manufacturing of electronic apparatuses meets the requirement for compact size combined with a desired processing power and storage capacity. On the other hand, a full utilization of e.g. the multifunctional capability of an electronic apparatus and usage of a plurality of applications at the same time to access various types of data, such as electronic documents, videos, music, and the like, may require a large-size display.

Compact-size electronic apparatuses may also elicit operation of the apparatuses by using one hand only. Some forms and shapes of electronic apparatuses are typically more suitable for one hand operation than others.

A number of approaches have been suggested for effecting both a compact size and a large display on an electronic apparatus. Those approaches include various types of foldable electronic apparatuses, where an electronic apparatus comprises at least two parts and where a display is mounted on each part.

SUMMARY

Particular embodiments of the invention aim at addressing at least some of the issues discussed above. According to a first exemplary embodiment of the invention there is provided an apparatus comprising a body, a cover attached to the body, and a display part comprising a display, the display part being attached to the body and configured to slide between a first position and a second position such that when the display part is at rest in the first position, the cover overlaps at least a portion of the display, and when the display part is at rest in the second position, said portion of the display is visible.

According to a second exemplary embodiment there is provided an apparatus comprising a body, a cover attached to the body, the cover being configured to slide between a closed position and an open position, and a display part comprising a display, the display part being attached to the body and configured to slide between a first position and a second position such that when the display part is at rest in the first position and the cover is at rest in the closed position, the cover overlaps at least a portion of the display, and when the display part is at rest in the second position, said portion of the display is visible.

According to the exemplary embodiments, an apparatus may comprise a display part that is configured to slide between two positions such that when the display part is in an open, or popped-up, position, a display is visible substantially in its entirety. The apparatus may also comprise a cover that is similarly configured to slide between at least two positions.

Various exemplary embodiments of the present invention are illustrated hereinafter in the detailed description of the invention as well as in the dependent claims appended hereto. The embodiments are illustrated with reference to selected aspects of the invention. A person skilled in the art appreciates that any embodiment of the invention may apply to other aspects as well either alone or in combination with other embodiments.

BRIEF DESCRIPTION OF THE DRAWINGS

The invention will be described, by way of example only, with reference to the accompanying drawings, in which:

FIG. 2A shows a schematic picture in front view of an electronic apparatus according to an embodiment;

FIG. 2B shows a schematic picture in rear view of an electronic apparatus according to another embodiment;

FIG. 2C shows a schematic picture in side view of the electronic apparatus shown in FIG. 2B;

DETAILED DESCRIPTION

In the following description, like numbers denote like elements.

Figure 1A:
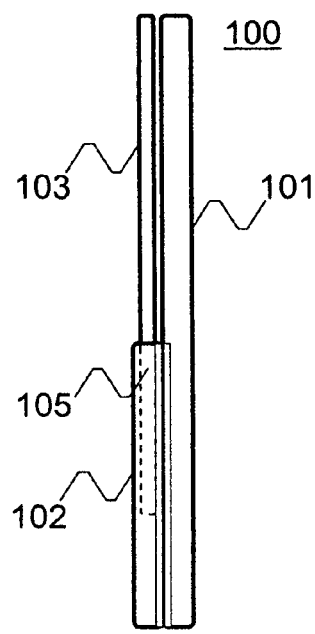
FIG. 1A shows a schematic picture in side view of an electronic apparatus being in a first state according to an embodiment of the invention.
Figure 1B:
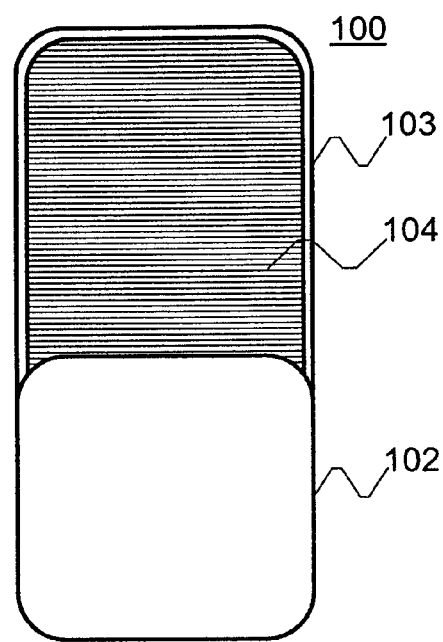
FIG. 1B shows a schematic picture in front view of the embodiment depicted in FIG. 1A.

FIG. 1A outlines, in a simplified view, an electronic apparatus 100 in a first state according to at least one embodiment of the invention. FIG. 1B shows the electronic apparatus 100 in front view.

The apparatus 100 comprises a body 101, a cover 102 attached to the body 101, and a display part 103 including a display 104. FIGS. 1A and 1B shows the apparatus 100 in a first state, where the display part 103 is in a first position. When the display part is in said first position, the cover 102 overlaps a portion 105 of the display part 103, as show by the dotted line in FIG. 1A.

Figure 1C:
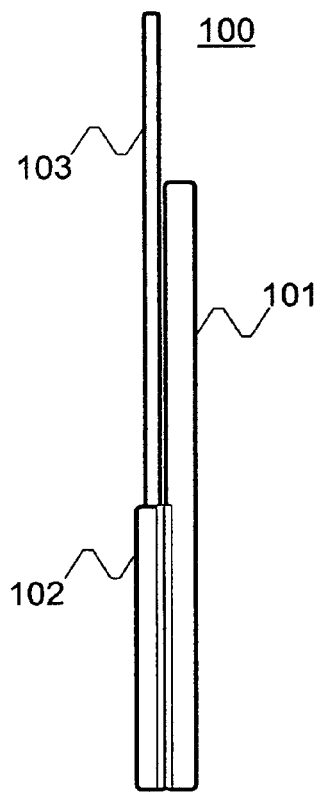
FIG. 1C outlines in side view an electronic apparatus being in a second state according to the embodiment of FIGS. 1A and 1B.
Figure 1D:
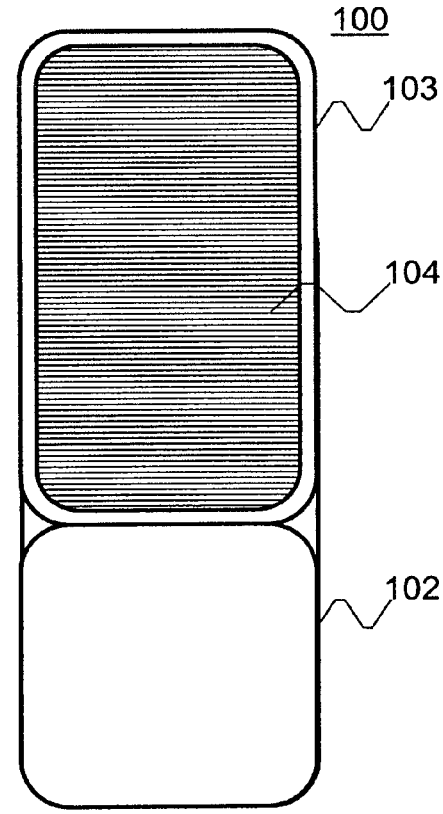
FIG. 1D outlines in front view the electronic apparatus shown in FIG. 1C.

FIGS. 1C and 1D show the apparatus 100 in a second state, where the display part 103 is in a second position. In the embodiment depicted in FIGS. 1A to 1D, the second state may be reached by causing the display part 103 to slide in the direction of a longitudinal axis of the body 101 of the apparatus 100. In said second position, the display part 103 is visible substantially in its entirety, including the portion 105 that is covered by the cover 102, when the display part 103 is in the first position. The apparatus 100 can be returned to the first state by causing the display part 103 to slide back to the first position.

The body 101 of the apparatus 100 encloses a plurality of electronic components and circuitry, such as a processor/controller, that enable the apparatus to operate according to its specifications. The apparatus may be e.g. a mobile phone, a Personal Digital Assistant (PDA), a handheld computer, a remote controller, a game console, a music player (e.g. an MP3 player), or the like.

The display 104 may be a liquid crystal display (LCD). The display 104 may be provided with touch display functionality. As can be seen in the embodiment of FIGS. 1A and 1B, the dimensions of the display part 103 may be such that when the display part 103 is in the first position, or "popped-down", the upper edge of the display part 103 does not extend beyond the upper edge of the body 101 of the apparatus. In other words, in said state the dimensions of the apparatus 100 may be made to substantially match those of the body 101 of the apparatus 100. As shown in FIGS. 1C and 1D, substantially the whole surface of the display 104 may be available to a user of the apparatus 100, when the display part 103 is in the second position, or "popped up".

FIG. 2A depicts in a simplified view an embodiment, where an apparatus 200 comprises a display part 201 including a display 202, and a cover 203. Said components correspond to the display part 103, the display 104, and the cover 102 of the apparatus 100 of FIGS. 1A to 1D. In the embodiment of FIG. 2A, the apparatus 200 comprises a trigger 204. The trigger 204 may be a switch, a push button, a slide button, a touch button, or the like. The trigger is electrically coupled to the electronic components and circuitry of the apparatus 200 enclosed in the body (e.g. the body 101 of FIGS. 1A and 1C) of the apparatus e.g. via cables, wires, connectors, or a combination thereof.

According to an embodiment shown in FIG. 2A, the display part 201 is configured to slide from a first position to a second position, or "pop up", in a manner described hereinbefore in connection with FIGS. 1A to 1D, responsive to a user of the apparatus 200 operating the trigger 204. The operation of the trigger may comprise for example pushing a push button or touching a touch button. The operating of the trigger 204 may cause e.g. electric connectors making a contact, which in turn may cause a drive motor, such as a servo motor, to obtain its operating current e.g. as a consequence of a control current flowing through the contact made by the electric connectors responsive to the user operating the trigger 204. The drive motor may then cause a sliding motion of the display part 201 between the first position and the second position. In other words, in the embodiment shown in FIG. 2A, a user can make the display part "pop up" and "pop down", i.e. slide between a first position and a second position, by operating the trigger 204.

FIG. 2B shows an embodiment, where a cover 203 is configured to slide along the longitudinal axis of the body 205 of the apparatus 200 from a closed position to an open position. In the embodiment shown in FIG. 2B, the cover 203 is configured to slide downwards, i.e. into the same direction as the "pop down" direction of the sliding motion of the display part 201 of FIG. 2A. The cover 203 may comprise a device 206 adapted to receive an external memory medium. In that case, when the apparatus 200 is in the state of the cover 203 being in an open position, the device 206 is visible. The device 206 may be e.g. a memory card slot, a smart card slot, a universal serial bus (USB) port, or the like. The device 206 is operatively coupled to the electronic components and circuitry, e.g. a processor/controller, of the apparatus 200 via cables, wires, connectors, or a combination thereof.

FIG. 2C shows the embodiment of FIG. 2B in side view. FIG. 2C shows a body 205, a display part 201 and the cover 203 in an open position. FIG. 2C further shows a portion of a housing 206, which may be formed as a part of the body 205. The housing 206 may be provided e.g. to enclose a portion of the display part 201, as shown by the dotted line. The cover 203 may be attached to the housing 206 by means of a mechanism that enables a sliding motion according to the present embodiment. An example of such mechanism is discussed hereinafter in connection with FIG. 8. In another embodiment, the cover 203 may be immovably attached to the body 205 or the housing 206. The apparatus 200 may also be provided without the housing 206. In that case, the cover 203 may be attached to the body 205 by means of a mechanism that enables a sliding motion according to the present embodiment.

Figure 3A:
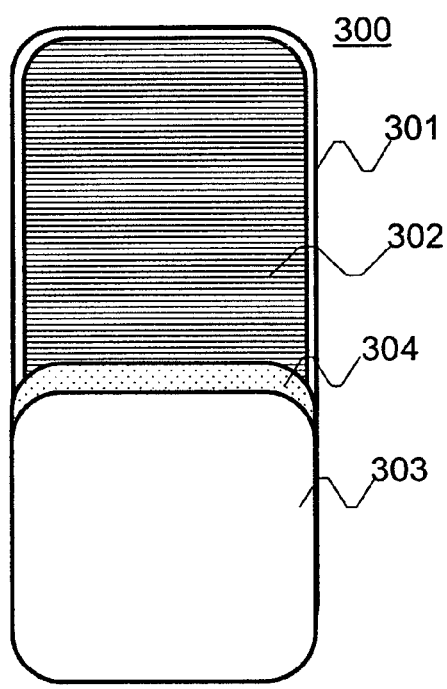
FIG. 3A shows a schematic picture in front view of an electronic apparatus according to an embodiment.

FIG. 3A shows a front view of an embodiment, where a cover 303 (corresponding to e.g. the cover 203 of FIG. 2C) is adapted to slide to an intermediate position, that lies between the closed position and the open position discussed hereinbefore in with reference to FIGS. 2B and 2C. FIG. 3A shows an apparatus 300 comprising the cover 303, a light guide 304, and a display part 301 including a display 302. As shown in FIG. 3A, a portion of the light guide 304 is visible when the cover 303 is slid to the intermediate position between the closed position and the open position. The light guide 304 may be mounted e.g. on a housing for the display part 301, as discussed further hereinafter with reference to FIG. 8. According to the embodiment of FIG. 3A, the light guide 304 may be configured to be illuminated by a light source, such as a light emitting diode (LED), when the cover 303 is at the intermediate position. This may be achieved e.g. by means of a piece of electricity conducting material, such as metal, mounted on the cover such that contact between connectors is made when the cover 303 is in the intermediate position.

The apparatus 300 of the embodiment shown in FIG. 3A may also be configured to initiate a user interface action responsive to the cover 303 sliding to the intermediate position. The user interface action may be initiated in addition or alternatively to the illumination of the light guide 304. Said user interface action may be e.g. locking/unlocking a keypad or touch pad. In a similar manner to the illumination of the light guide, the cover may be equipped with a conductor piece that causes a control current when it is brought into contact with electric connectors. The control current may be detected and interpreted as a state change by a controller of the apparatus 300, and the controller may initiate the user interface action responsive to the state change.

Figure 3B:
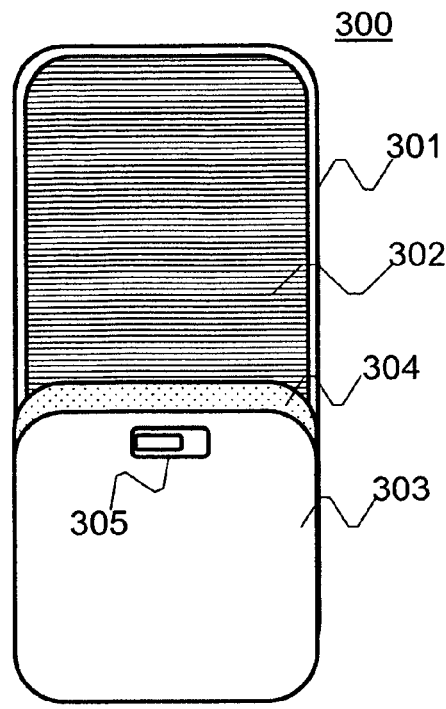
FIG. 3B shows a schematic picture in front view of an electronic apparatus according to another embodiment.

FIG. 3B shows an embodiment, where the apparatus 300 discussed with reference to FIG. 3A further comprises a trigger 305 that is configured to cause the display part 301 to slide between a first position and a second position. In other words, operating the trigger causes the display part 301 to pop up from its housing and pop back down into the housing. The function of the trigger 305 is similar to the trigger 204 discussed hereinbefore in connection with FIG. 2A.

Figure 4:
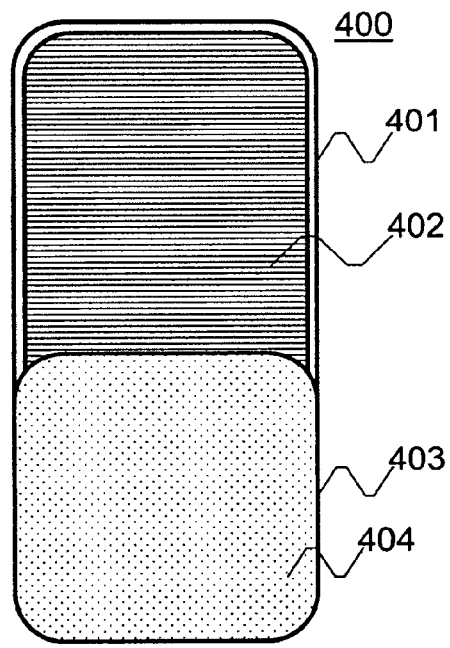
FIG. 4 shows a schematic picture in front view of an electronic apparatus according to an embodiment.

FIG. 4 shows a further embodiment of an apparatus 400, where the cover 403 comprises a grip area 404 adapted to prevent slipping when the apparatus 400 is held and operated with one hand. The grip area 404 may comprise e.g. a suitable texture on the surface of the cover 403 produced in a manner suitable for the material of the cover 403. The display part 401 and the display correspond to those discussed in connection with the previous Figures.

The grip area 404 may also comprise holes, the size of which may range e.g. from 0.01 mm to 1 mm in diameter. In this embodiment, the holes may serve also as a means for preventing slipping and a means for making visible the portion of the display 402 that is covered by the cover 403. For example, a screen saver may run on the portion of the display 402 that is behind the cover 403, and provide information, such as time and date, for a user of the apparatus 400.

The holes of the grip area 404 may be made e.g. by punching, drilling, etching, and by laser. In an embodiment, the holes may further comprise rods fitted in the holes. Each rod may be adapted to move along a longitudinal axis of the respective hole responsive to receiving energy e.g. from a servo motor or via inductive coupling. The rods may be configured to move such that the protruding portions of the rods form characters of e.g. the western or the Braille alphabet.

Figure 5:
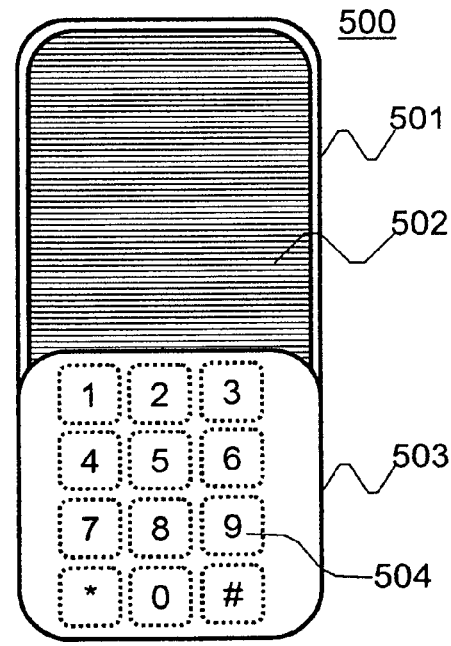
FIG. 5 shows a schematic picture in front view of an electronic apparatus according to yet another embodiment.
Figure 6:
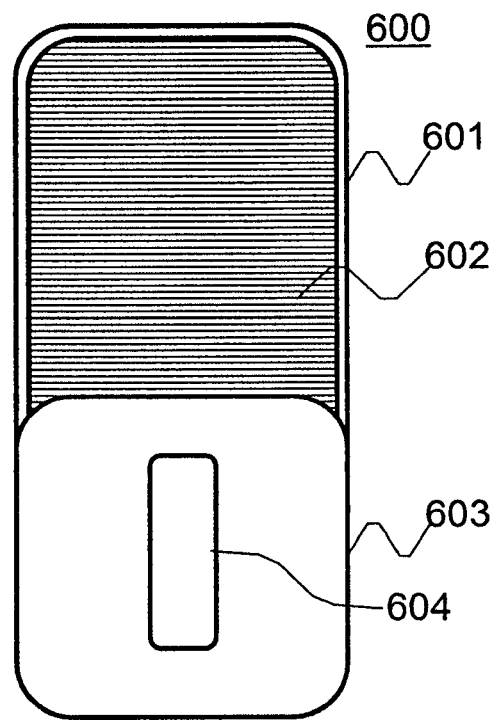
FIG. 6 shows a schematic picture in front view of an embodiment of an electronic apparatus.

FIG. 5 depicts another embodiment, where the cover 503 comprises a keypad 504 configured to enable e.g. input of data, such as phone numbers, for processing by a controller/processor of the apparatus 500. The keypad may comprise e.g. a plurality of sheet metal or capacitive keys. FIG. 6 depicts an embodiment, where the cover 603 comprises a scroller 604, such as a capacitive scroller that can be used to control a pointer in the user interface of the apparatus 600. The display parts 501, 601 and displays 502, 602 are similar to those discussed hereinbefore in connection with previous Figures.

The cover 603 may be made of flexible transparent material, such as foil, through which the portion of the display 602 that is overlapped by the cover 603 is visible. In this embodiment, a separate scroller 604 need not be embodied on the cover 603, but the scroller 604 may comprise a scroller touch area on the display 602.

In some embodiments, the cover 603 and the corresponding covers depicted in other Figures may be replaced by a user. This enables customization and personalization of apparatuses that provide such a replaceable cover.

A skilled person appreciates that each of the embodiments shown in FIGS. 1 to 6 may be implemented on an apparatus either alone or in combination with other embodiments.

Figure 7:
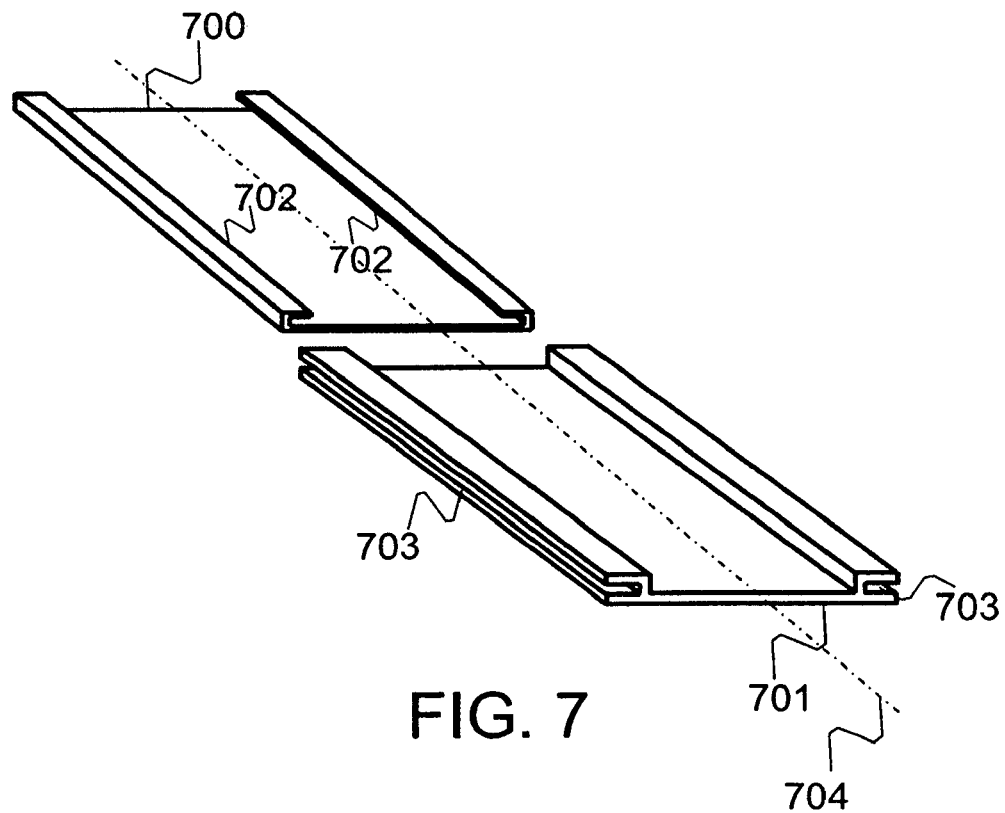
FIG. 7 depicts an exploded isometric view outlining the structure of two plates enabling a sliding motion according to an embodiment.

FIG. 7 depicts a simplified example of the structure of a first plate 700 and a second plate 701 that may be used to enable the sliding motion of the display part (shown e.g. in FIGS. 1A to 1D with reference numeral 103) according to at least one embodiment. The first plate 700 comprises sliding guides 702 formed on opposing sides of the first plate 700. The second plate 701 comprises sliding guides 703 formed on the opposing sides of the second plate 701 such that the position and dimensions of the sliding guides 703 substantially match those of the sliding guides 702 of the first plate 700. In the embodiment depicted in FIG. 7, the first plate 700 and the second plate 701 are adapted to be slid with respect to each other in the direction of the longitudinal axis 704 of the first plate 700 and the second plate 701. In the exemplary embodiment of FIG. 7, the sliding guides 702, 703 are provided in the form of sliding rails and sliding channels, respectively.

The exemplary plates of FIG. 7 may be installed e.g. on the apparatus 100 shown in FIGS. 1A to 1D in order to provide the sliding motion between a first position and a second position described hereinbefore with reference to said Figures. The first plate 700 may be installed e.g. on the front surface of the body 101, and the second plate may be mounted on the back surface of the display part 103 shown in FIGS. 1A and 1C. For this purpose, the first plate 700 and the second plate 701 may comprise suitable means for enabling said mounting and installation, for example holes for screw fastening (not shown in FIG. 7).

The first plate 700 and the second plate 701 may further comprise e.g. grooves for attaching springs or the like (not shown) for producing a proper resistance and/or repulsive force during the sliding motion in order to bring about a smooth sliding motion.

The first plate 700 and the second plate 701 may further comprise suitable means for providing appropriate resistance for stopping the sliding motion at desired locations. For example, the first plate 700 may further comprise stopper grooves (not shown), and the second plate may further comprise stopper springs (not shown) that correspond to the stopper grooves. When the first plate 700 and the second plate 701 are slid to such a position with respect to each other that the stopper springs are seated, possibly firmly but not fixedly, in the stopper grooves, the sliding motion of the first plate 700 and the second plate with respect to each other is resisted or stopped. Setting the first plate 700 and the second plate 701 to a sliding motion again would then require a force to be applied on the first plate 700 and/or the second plate 701 in the direction of the longitudinal axis of the plate(s).

The first plate 700 and the second plate 701 may further comprise suitable means for receiving a force from an external source, such as a servo motor. Said force is provided to cause the sliding motion of the plates. Said suitable means may comprise e.g. a squeeze mechanism for fastening a driving belt to one of the plates. The driving belt carries rotational motion from the servo motor to the plate and transforms the rotational motion into a sliding motion.

Figure 8:
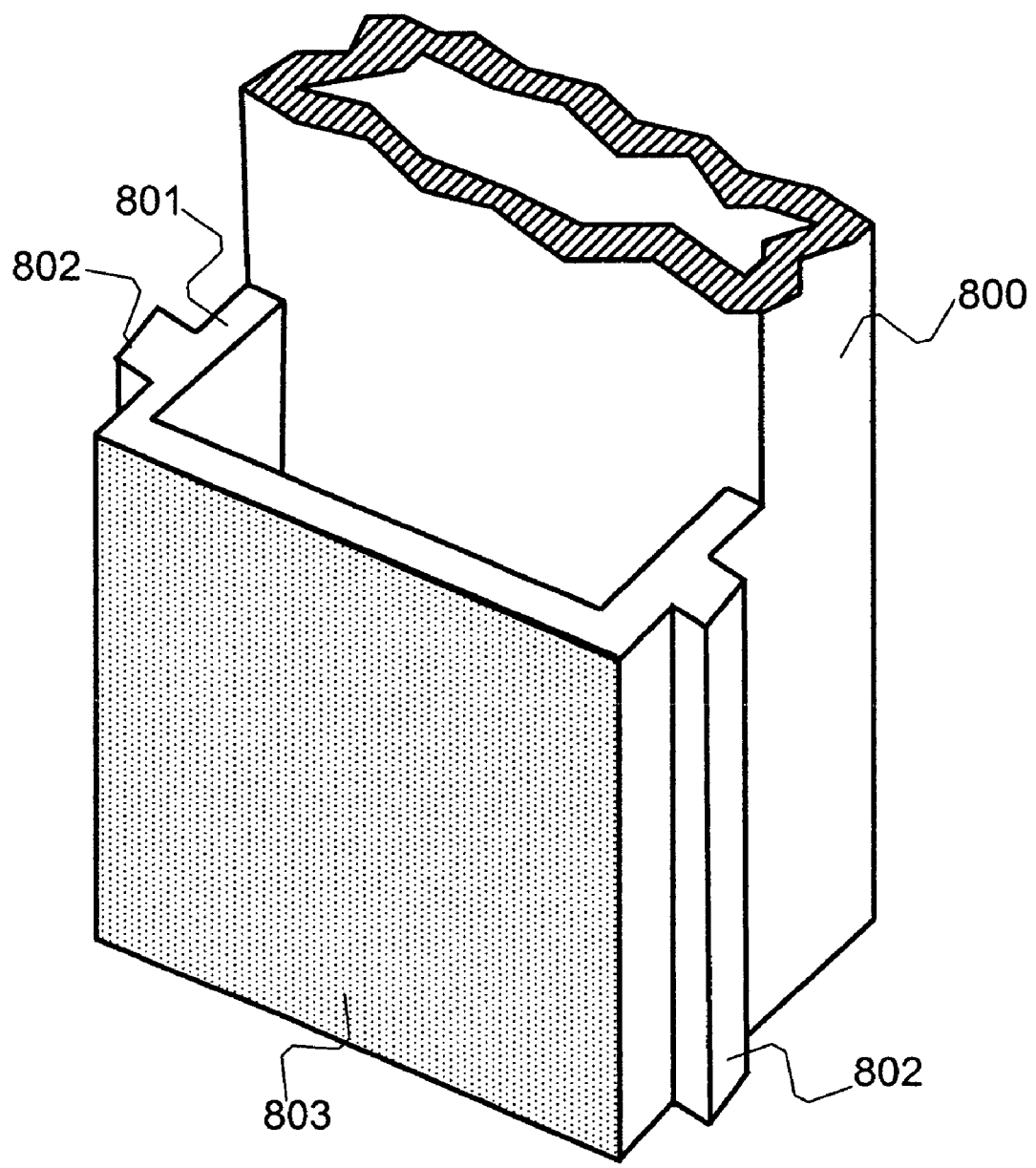
FIG. 8 shows an isometric view outlining the structure of a housing forming a part of the body of an electronic apparatus according to an embodiment.

FIG. 8 depicts a simplified isometric view of an example of a housing 801 according to an embodiment that may be adapted to enclose a portion of a display part in a manner shown e.g. in FIG. 2C and discussed hereinbefore in connection with said Figure. FIG. 8 further shows a portion of a body 800 corresponding to e.g. the body 101 shown in FIGS. 1A and 1C, sliding guides 802, and a light guide 803 mounted on the housing 801. In the exemplary embodiment of FIG. 8, the sliding guides are provided in the form of sliding rails.

A cover (not shown) may be attached to the housing 801 using sliding guides, e.g. sliding channels that correspond to the sliding guides 802. This method of attachment enables the sliding motion of the cover described hereinbefore with reference to FIGS. 2B and 2C. Sliding the cover to an open position as discussed hereinbefore with reference to FIGS. 2B and 2C, or to an intermediate position discussed hereinbefore with reference to FIGS. 3A and 3B, causes the light guide 803 to become visible.

As discussed earlier, the light guide 803 may be adapted to be illuminated when the cover is slid to an intermediate position. A user interface action may also be initiated responsive to sliding the cover to the intermediate position. To support said features, the sliding guides 802 may be equipped with suitable electric connectors and/or conductors to cause a control current or operating current to flow when the cover is slid into a position where it causes an electric connection to be made by the electric connectors and/or conductors. The sliding guides of the cover may be equipped with corresponding connectors or conductors in order to make the electric connection. A controller of an apparatus may be configured to detect the control current and initiate, or instruct a user interface controller to initiate, the user interface action, such as locking or unlocking a keypad. Such controller may be housed e.g. by the body 800 shown in FIG. 8.

Various embodiments described herein may provide an improved user experience particularly in a small-sized electronic apparatus, such as a mobile phone, a Personal Digital Assistant (PDA), a handheld computer, a remote controller, a game console, a music player (e.g. an MP3 player), or the like. Having a display part of the apparatus in a first position, or "popped-down" position, contributes to a compact size of the apparatus by bringing the outer dimensions of the apparatus substantially down to those of the body of the apparatus. When the display part is in a second position, or "popped-up" position, a user of the apparatus has a large-size display at his disposal, possible including touch display functionality. At least one embodiment may also reduce the possibility of the apparatus slipping out of hand, which may be useful in one hand operation of the apparatus. Some embodiments may make an electronic apparatus easier to detect e.g. in dim light by improving the illumination of the apparatus.

The foregoing description has provided by way of non-limiting examples of particular implementations and embodiments of the invention a full and informative description of the best mode presently contemplated by the inventors for carrying out the invention. It is however clear to a person skilled in the art that the invention is not restricted to details of the embodiments presented above, but that it can be implemented in other embodiments using equivalent means without deviating from the characteristics of the invention.

Furthermore, some of the features of the above-disclosed embodiments of this invention may be used to, advantage without the corresponding use of other features. As such, the foregoing description shall be considered as merely illustrative of the principles of the present invention, and not in limitation thereof. Hence, the scope of the invention is only restricted by the appended patent claims.

We claim:

1. An apparatus comprising
a body;
a cover movably attached to the body; and
a display part comprising a display, the display part being movably attached to the body and configured to slide in relation to the body between a first position and a second position such that when the display part is at rest in the first position, the cover overlaps at least a portion of the display, and when the display part is at rest in the second position, said portion of the display is visible.

2. An apparatus according to claim 1, wherein the cover comprises a trigger and the display part is configured to slide between the first position and the second position responsive to a user operating the trigger.

3. An apparatus according to claim 1, wherein the cover comprises a device configured to receive a memory medium, and wherein the cover is configured to slide between a closed position and an open position, the device being visible when the cover is in the open position.

4. An apparatus according to claim 2, wherein the cover comprises a device configured to receive a memory medium, and wherein the cover is configured to slide between a closed position and an open position, the device being visible when the cover is in the open position.

5. An apparatus according to claim 3, wherein the body further comprises a light guide, and wherein the cover is further configured to slide to an intermediate position between the open position and the closed position, the light guide being visible when the cover is in the intermediate position.

6. An apparatus according to claim 4, wherein the body further comprises a light guide, and wherein the cover is further configured to slide to, an intermediate position between the open position and the closed position, the light guide being visible when the cover is in the intermediate position.

7. An apparatus according to claim 5, wherein the apparatus is configured to initiate a user interface action responsive to the cover sliding to the intermediate position.

8. An apparatus according to claim 6, wherein the apparatus is configured to initiate a user interface action responsive to the cover sliding to the intermediate position.

9. An apparatus according to claim 1, wherein the cover comprises a grip area adapted to prevent slipping in one hand use of the apparatus.

10. An apparatus according to claim 9, wherein the grip area comprises holes adapted to prevent slipping and to make visible the portion of the display that is overlapped by the cover.

11. An apparatus according to claim 1, wherein the cover comprises holes, the holes comprising rods adapted to move in the holes such that protruding portions of the rods form characters of an alphabet.

12. An apparatus according to claim 1, wherein the cover comprises a key configured to enable input of data for processing in the apparatus.

13. An apparatus according to claim 1, wherein the cover comprises a scroller configured to enable the controlling of a pointer in the user interface of the apparatus.

14. An apparatus according to claim 1, wherein the cover is made of flexible transparent material, enabling access to a touch area on the display.

15. An apparatus comprising
a body;
a cover movably attached to the body, the cover being configured to slide between a closed position and an open position in relation to the body; and
a display part comprising a display, the display part being movably attached to the body and configured to slide in relation to the body between a first position and a second position such that when the display part is at rest in the first position and the cover is at rest in the closed position, the cover overlaps at least a portion of the display, and when the display part is at rest in the second position, said portion of the display is visible.

16. An apparatus according to claim 15, wherein the cover comprises a device configured to receive a memory medium, and wherein the device is visible when the cover is in the open position.

17. An apparatus according to claim 15, wherein the body further comprises a light guide, and wherein the cover is further configured to slide to an intermediate position between the open position and the closed position, the light guide being visible when the cover is in the intermediate position.

18. An apparatus according to claim 15, wherein the apparatus is configured to initiate a user interface action responsive to the cover sliding to the intermediate position.

* * * * *